United States Patent Office 3,208,517
Patented Sept. 28, 1965

3,208,517
METHOD OF SECONDARY RECOVERY
George G. Binder, Jr., Clark, N.J., and Charles D. Russell, Tulsa, Okla., assignors, by mesne assignments, to Esso Production Research Company, Houston, Tex., a corporation of Delaware
No Drawing. Filed Dec. 1, 1958, Ser. No. 777,210
4 Claims. (Cl. 166—9)

The present invention is broadly concerned with the recovery of oil from subterranean oil reservoirs. More particularly the invention relates to a method of oil recovery in which a viscous oil-in-water emulsion is used to displace the oil.

It is a well known practice in the petroleum industry, when an underground oil reservoir lacks sufficient natural oil driving means to maintain an economical oil production rate, to inject an oil displacing fluid into the reservoir. Thus, it has been the practice for some time to inject a gas or water into one or more injection wells within a reservoir so as to displace oil from the reservoir through one or more production wells. Methods of this type are generally referred to as methods of secondary recovery. The particular technique of using a liquid is generally described as a waterflooding technique. The present invention relates particularly to the technique of flooding an underground reservoir.

While conventional waterflooding is effective in obtaining additional oil from subterranean oil reservoirs, it has a number of shortcomings which detract seriously from its value. Foremost among these shortcomings is a tendency of flood waters to "finger" through a reservoir and to bypass substantial portions of the reservoir. In other words, a water drive has a less than perfect "sweep efficiency" in that it does not contact all portions of the reservoir. Furthermore it does not normally displace as much oil in the portions of the reservoir which it contacts as it theoretically is capable of doing.

The fingering tendency of a waterflood is usually explained by the fact that oil reservoirs possess regions and strata that have different permeabilities. The water flows more rapidly through those regions and strata having a greater relative permeability to water than in other portions of the reservoir. Waterflooding often completely misses substantial portions of the reservoir. The net result is an inefficient oil displacement action on the part of the water.

At this point, it should be noted that crude oils vary greatly in viscosity—some being as low as 1 or 2 cps. and some ranging up to 1000 cps. or even more. It has been established that waterflooding performs less satisfactorily with viscous crude oils than with relatively nonviscous oils. In other words, the fingering and bypassing tendencies of the water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. When this equation is applied to a flooding operation or the like within an oil reservoir, it reads as follows:

$$\frac{M_o}{M_e} = \frac{\mu_e}{\mu_o} \cdot \frac{K_o}{K_e}$$

where
$M_o$ is the mobility of the oil to the reservoir in question.
$M_e$ is the mobility of the flooding medium to the reservoir in question.
$\mu_o$ is the viscosity of the driven oil.
$\mu_e$ is the viscosity of the flooding medium.
$K_e$ is the relative permeability of the reservoir toward the flooding medium in the presence of residual oil.
$K_o$ is the relative permeability of the reservoir toward the oil in the presence of connate water.

This equation is perhaps best explained by stating that when the mobility ratio of oil to the driving fluid within the reservoir is equal to one, the oil and driving fluid move through the reservoir with equal ease. Substantially equilibrium proportions of driving fluid and oil remain within the reservoir as soon as the driving fluid has passed therethrough. Expressed othewise, the mobility ratio term affords a measure of the volume of driving fluid and the amount of time that are required to reduce the oil content of the reservoir to an ultimate equilibrium value. For example, a given volume of driving fluid operated at a mobility ratio of one or greater will displace a markedly greater volume of soil from a reservoir than will an equal volume of driving fluid operating at a mobility ratio of less than one.

Several procedures have been suggested to date for improving the mechanics of waterflooding procedures particularly with the view to reducing the degree of fingering and bypassing. One suggestion has been to increase the viscosity of the water drive relative to the oil by incorporating water soluble viscous agents within the water. Materials that have been suggested for this purpose include a wide variety of naturally occurring gums, sugars, and polymers. While these materials are effective to an extent in increasing the viscosity of flood water, they are also characterized by serious disadvantages. For example, some of the materials have a tendency to plug formations; some are relatively unstable; and some have relatively little thickening effect. Additionally many of these materials are quite expensive and their use is not feasible from the standpoint of economics.

Accordingly it is an object of this invention to provide an improved type of displacement process in which a marked increase in the viscosity of the driving fluid may be readily attained. It is also an object of the invention to provide a viscous "waterflooding" process in which the increased viscosity of the flood water is attained inexpensively. It is still a further object of the invention to use a driving fluid whose viscosity is stable.

These and related objects which will be expressly discussed, or readily apparent from the following description, are realized in accordance with this invention by use of a viscous oil-in-water emulsion. The oil-in-water emulsion may comprise the entire body of driving fluid or alternatively it may be only a portion of the driving fluid. In the latter event however the oil-in-water emulsion should be incorporated within the front portion of the flood. In any case the oil-in-water emulsion should be located within the leading portion of the flood drive in order that the effect of the resulting viscosity increase may be fully explained.

When the oil-in-water emulsion is only incorporated within the leading portion of the fluid drive, the quantity of oil-in-water emulsion should be sufficient to prevent the trailing relatively nonviscous water from breaking through the oil-in-water emulsion and contacting the reservoir oil directly. The minimum quantity of oil-in-water emulsion to be used as a bank in front of the driving water in any given reservoir will depend on such well recognized factors as the flooding pattern, the distance between wells, the viscosity of the oil, and so forth. In some reservoirs it is contemplated that the volume of the oil-in-water emulsion need not exceed about 10% of the pore volume of the reservoir to be contacted by the emulsion. In most reservoirs, however, it is contemplated that the volume of oil-in-water emulsion should be at least about 25% of the pore volume of the reservoir contacted by the emulsion.

As to the portion of a reservoir contacted by the emulsion, it is assumed that the pore volume contacted is normally in the range of about 75–95 percent of the pore volume of the reservoir (or portion thereof) being flooded. Since it is conventional practice to carry out flooding operations using certain regular flooding patterns, it may be convenient in such instances to define the volume of the reservoir under flood as the volume underlying the lateral area defined by one or more patterns. To illustrate, in "line drive floods" it is assumed that the pore volume contacted is normally in the range of about 75–95 percent of the pore volume of the reservoir underlying the lateral area between the line of injection wells and the line of producing wells.

With respect to the oil-in-water emulsion to be employed in a process of this invention, the emulsion may be prepared in any conventional way such as forcing the water, oil, and an emulsifying agent under pressure through a small orifice or a homogenization nozzle. Various surface active agents may be used as the emulsifying agent. Examples of such surface active agents are water soluble polyethoxylated nonyl phenol, stearyl ammonium acetate, sodium dioctylsulfosuccinate, polyoxyethylated sorbitan mono-stearate, morpholine oleate, sodium lauryl sulfate, sodium (di-isobutyl) benzene sulfonate. In this regard reference is made to Emulsions, Theory and Practice, by Beecher, published by Reinhold Publishing Corp., New York, U.S.A., copyrighted 1957. Reference is made especially to page 189 thereof with reference to the HLB method (hydrophile-lipophile balance). This method is an aid in determining which agents are suitable as emulsifiers for preparation of oil-in-water emulsions.

The viscosity of the oil-in-water emulsion may be varied as desired, but it is generally preferred that the vsicosity not exceed about 1000 centipoises in any case. It is preferred, where possible and feasible, that the viscosity of the emulsion be such that the mobility ratio of the emulsion and the reservoir oil approaches a value of one. The amount of water by weight may vary from about 1 to about 50 times the weight of the oil in the emulsion. However, it is normally preferred that there be about 10 times as much water as oil in the emulsion. It is normally desired that an emulsifying agent be used to stabilize the emulsion. The emulsifying agent will normally comprise between about 0.1 and about 10 percent of the weight of the emulsion.

The water used in the emulsion may be fresh water, brackish water, or water similar to that of the reservoir. The oil used in the emulsion may be crude oil, light oil such as naphtha or kerosene, or lighter components such as propane or butane.

It is preferred that the viscosity of the emulsion be adjusted such that the mobility ratio of the emulsion driving fluid and the reservoir oil approach a value of one. It is to be noted that mobility ratios of greater than one return very little in the way of additional oil recoveries; but that at ratios less than one, oil recoveries fall off quite rapidly.

Oil-in-water emulsions are particularly well suited for those reservoirs in which $K_o/K_e$ (relative permeability of the reservoir to oil over its relative permeability to the driving fluid) is very high, for example, in the order of 20 to 1. In this case the viscosity of the driving fluid can be considerably less than that of the oil and yet have a favorable mobility ratio. This permits an oil-in-water emulsion to be formed using a relatively small percentage of oil in the emulsion. The viscosity of the oil-in-water emulsion may be considerably less than the oil, yet efficient displacement may be obtained. In this type recovery method, in some cases, benefits may be obtained with the viscosity of the oil-in-water emulsion as low as 2 cps. measured at 60° F. However from a practical viewpoint the emulsion preferably should have a viscosity of at least about 4 cps. at 60° F.

In carrying out the method of this invention any given reservoir is provided in a conventional manner with a predetermined number of injection wells and production wells. It will be noted at this point that the invention is adapted to line drive flooding techniques as well as to the techniques that employ five-spot patterns, seven-spot patterns, and the like.

After the desired number of injection and production wells have been prepared, the oil-in-water emulsion is introduced into the oil reservoir through the injection wells. As noted earlier the viscosity of the solution is preselected preferably such that the mobility ratio of the emulsion to the reservoir oil is approximately one.

In speaking of the viscosities of the emulsions and the reservoir oil, the viscosities referred to are those existing within the reservoir. The temperature of the reservoir of course has a bearing upon these values.

The viscosity of the reservoir oil may be determined in a conventional manner—e.g., by obtaining an actual sample of the oil, or by reconstituting a sample of the oil and thereafter determining its viscosity value.

The relative permeabilities of the reservoir to oil and to the emulsion may also be obtained in a conventional manner—e.g., by measurement made on a core sample of the formation.

As mentioned earlier, the emulsion may be injected as a relatively narrow bank; but it is necessary that the bank be sufficiently large that water breakthrough (i.e., through the bank) may not occur until the reservoir has been traversed by the solution from the injection wells to the production wells. Conventional waterflooding rates may be used; for example, about 0.1 to 1 foot of linear movement through the reservoir per day. Once the desired volume of emulsion has been injected into the reservoir, flood water in the form of fresh water, salt water, or the like may be injected as in a conventional waterflooding program. The secondary recovery operations are continued until whatever practical amounts of oil have been withdrawn from the reservoir. At this time the process may be discontinued.

As a specific example, the following emulsion was prepared and used to displace oil from a sandstone model. The particular emulsion used contained by weight 30% Primol (a refined white oil consisting mainly of high molecular weight aliphatic hydrocarbons which boils at about 550° F. and is 95% vaporized at about 893° F. and has a specific gravity of about 0.884 at 60° F., a flash point of 405° F. and a pour point of about —20° F. refined mineral oil), 6% emulsifier (a mixture of approximately equal portions of oleic acid and sodium oleate), and 64% water (100 parts per million sodium chloride). The viscosity of the emulsion was 45 centipoise.

The oil-in-water emulsion was used to displace Primol (a white refined oil having a viscosity of 140 centipoise) from a Torpedo sandstone model 1 foot long and 2 inches in diameter. The Torpedo sandstone model had a permeability of approximately 1.6 darcys, a porosity of approximately 20% and 18.3% pore volume connate water. The connate water contained 1000 parts per million sodium chloride. Using the above-described emulsion as a displacing medium the oil recovery at breakthrough was 78% of the oil-in-place. When the emulsion injected equaled 1 pore volume the recovery of the oil-in-place was 83%. The produced emulsion was very similar in characteristics to the emulsion injected. In other words the emulsion characteristics were apparently unaltered by the flow in the sand.

As a comparison of the effectiveness of the emulsion as a displacing medium a conventional waterflood was conducted in another model cut from the same Torpedo sandstone, and having the same dimensions, porosity, and permeability given above. The conventional waterflood recovery of Primol in the second model resulted in a recovery of 28% of the oil-in-place at water breakthrough and 45% of the oil-in-place at 1.5 pore volume injected.

In the sample where oil-in-water emulsion was used to displace Primol the recovery was 78% of the oil-in-place at breakthrough and 83% of the oil-in-place at 1.0 pore volume of the fluid injected. The superiority of the oil-in-water emulsion as a displacing medium over the conventional waterflood is quite significant.

It will be recognized that a number of variations in this procedure may be employed without departing from the scope or sphere of the invention. Thus, it is contemplated that at least a portion of the viscous emulsion may be withdrawn from the reservoir at various points and recycled or returned to the reservoir at prior points within the reservoir. Any recycle solutions should preferably be returned to a later point in the bank of emulsion although this is not entirely necessary as beneficial results may still be derived from the recycle operation even though return to the bank itself is not realized.

The invention claimed is:

1. A method of flooding a subterranean oil reservoir to improve recovery of oil therefrom which comprises: injecting as a leading edge of a flood an emulsion of oil-in-water within the reservoir through an input well; driving said emulsion through the reservoir to displace oil from at least a portion thereof; and recovering the displaced oil through an output well spaced from the input well.

2. The process as defined in claim 1 in which the quantity of emulsion injected is least about 5% of the pore volume of the reservoir contacted by the emulsion.

3. A method as defined in claim 1 in which the mobility ratio of the emulsion to the reservoir oil is adjusted to be approximately one.

4. A process as defined in claim 1 in which the concentration of oil within the emulsion is at least about 2% by weight of the emulsion but less than that required to give the emulsion a viscosity of about 1000 centipoises.

References Cited by the Examiner

UNITED STATES PATENTS

| | | | |
|---|---|---|---|
| 2,596,137 | 5/52 | Fast | 166—22 |
| 2,731,414 | 1/56 | Binder et al. | 252—8.55 |
| 2,742,426 | 4/56 | Brainerd | 166—42 X |
| 2,802,531 | 8/57 | Cardwell et al. | 252—8.55 |
| 2,920,041 | 1/60 | Meadors | 166—9 X |
| 2,988,142 | 6/61 | Maly | 166—9 |

OTHER REFERENCES

Text-Book of Physical Chemistry, by Glasstone, published by D. Van Nostrand Co., Inc., copyrighted 1940, pages 1225 and 1251.

CHARLES E. O'CONNELL, *Primary Examiner.*

BENJAMIN BENDETT, *Examiner.*